Dec. 12, 1933.            C. O. HULL                1,939,451
                    FLEXIBLE METALLIC CONDUIT
                       Filed May 13, 1931

Inventor:
Clifford O. Hull,
by Charles E. Mullan
His Attorney.

Patented Dec. 12, 1933

1,939,451

UNITED STATES PATENT OFFICE 1,939,451

FLEXIBLE METALLIC CONDUIT

Clifford O. Hull, Stratford, Conn., assignor to General Electric Company, a corporation of New York Application May 13, 1931. Serial No. 537,129

4 Claims. (Cl. 247—41)

My invention relates to flexible metallic conduit and more particularly to conduit formed of spirally wound metal with interlocking turns.

For certain applications, it is desirable that such flexible conduit, in addition to forming an armor for the conductors placed in it, should provide an electrical shield for the conductors. Also, it is desirable that the flexible conduit should provide a tight covering which resists the leakage of oil, water or other fluid into the conduit, since such leakage has a tendency to destroy the insulation on the conductors.

The usual forms of flexible conduit with interlocking metal spirals do not satisfy these requirements. Even though such conduit were carefully made and the spirals formed to contact with the adjacent spirals, oxidation may cause the convolutions to become insulated from one another. In addition, in providing the necessary flexibility between the convolutions, it was not possible to make the conduit resistant to the leakage of oil or other fluids.

The object of my invention is to provide a flexible metallic conduit formed with spirally wound metal with interlocking turns that will provide an electrical shield for the conductors contained therein and will also be resistant to the leakage of fluids.

Figure 1:
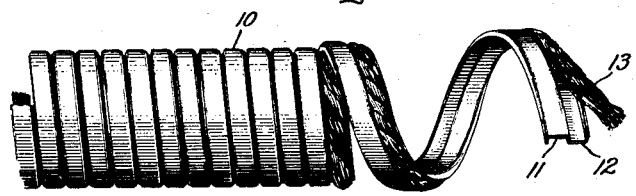
Figure 2:
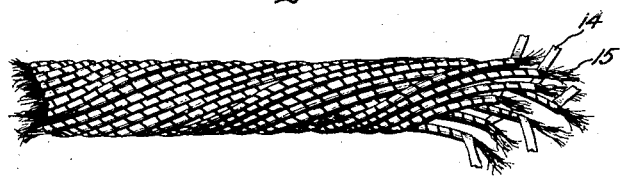
Figure 3:
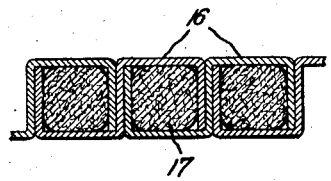

In the drawing, Fig. 1 shows a portion of a flexible conduit in elevation with one end expanded embodying my invention, Fig. 2 is a detail view on a larger scale of cord material used in carrying out my invention, and Fig. 3 is an enlarged sectional view of a modified form of my invention.

Referring to the drawing, 10 indicates a flexible metallic conduit comprising a strip of metal bent to form longitudinally extending oppositely facing grooves 11 and 12, the strip being wound spirally with adjacent turns in interlocking engagement.

According to my invention, I provide in the crowns of the convolutions a continuous cord 13 which comprises strands of suitable conducting materials, such as copper, which contacts with the convolutions to connect them electrically to each other throughout their length. Preferably, the cord comprises strands of conducting material 14 wound around a fibrous filler 15, such as cotton thread for example. The filler thus forms a packing between the convolutions to prevent leakage through the walls of the conduit. Also the filler serves to provide a flexible support for the copper strands and to limit the amount of copper required. The use of a cord of fibrous material upon which the copper strands are wound serves also to minimize the stress on the copper strands when the conduit is flexed.

It will thus be seen that cord 13 by means of the copper strands provides an electrical bond between successive convolutions of low electrical resistance. This permits electricity to flow longitudinally of the conduit through a low resistance path instead of following the spirals of the conduit, which would be a high resistance path. The cord 13, comprising fibrous material with very thin strands of copper, makes a good packing for the joints between the interlocking convolutions. Therefore, this cord resists the leakage of oil or other fluids between the successive convolutions. This resistance to leakage is of particular importance when the conduit is used for ignition cable for automobiles, aeroplanes, or similar uses where oil and water are quite likely to cover the cable and ultimately destroy its insulation unless it is so protected.

When a cord is inserted in the convolutions, it serves to force together the side walls of adjacent turns tending to give good electrical contact between them and in some instances I may utilize a cord comprising fibrous material only, omitting the conducting strand. Such a construction is shown in Fig. 3 wherein 16 indicates successive spirals of the conduit and 17 indicates the cord material which may be fibrous material such as cotton. As will be noted, adjacent walls of the spirals are in engagement with each other thereby providing a good electrical path for current.

What I claim as new and desire to secure by Letters Patent of the United States, is:

1. A flexible metallic conduit comprising interlocking spirals of metal and a cord in the crowns of the spirals comprising a continuous conductor which provides an electrical bond between the spirals and fibrous material which forms a packing to prevent leakage between the spirals.

2. A flexible metallic conduit comprising interlocking spirals of metal and a cord in the crowns of the spirals comprising fibrous material on which is wound a continuous conductor.

3. A flexible metallic conduit comprising interlocking spirals of metal, a cord in the crowns of the spirals comprising fibrous material and continuous conductors wound together spirally.

4. A flexible metallic conduit comprising interlocking spirals of metal and a cord in the crowns of the spiral comprising threads of fibrous material and strips of a continuous conductor wound together spirally.

CLIFFORD O. HULL.